Figure 1:
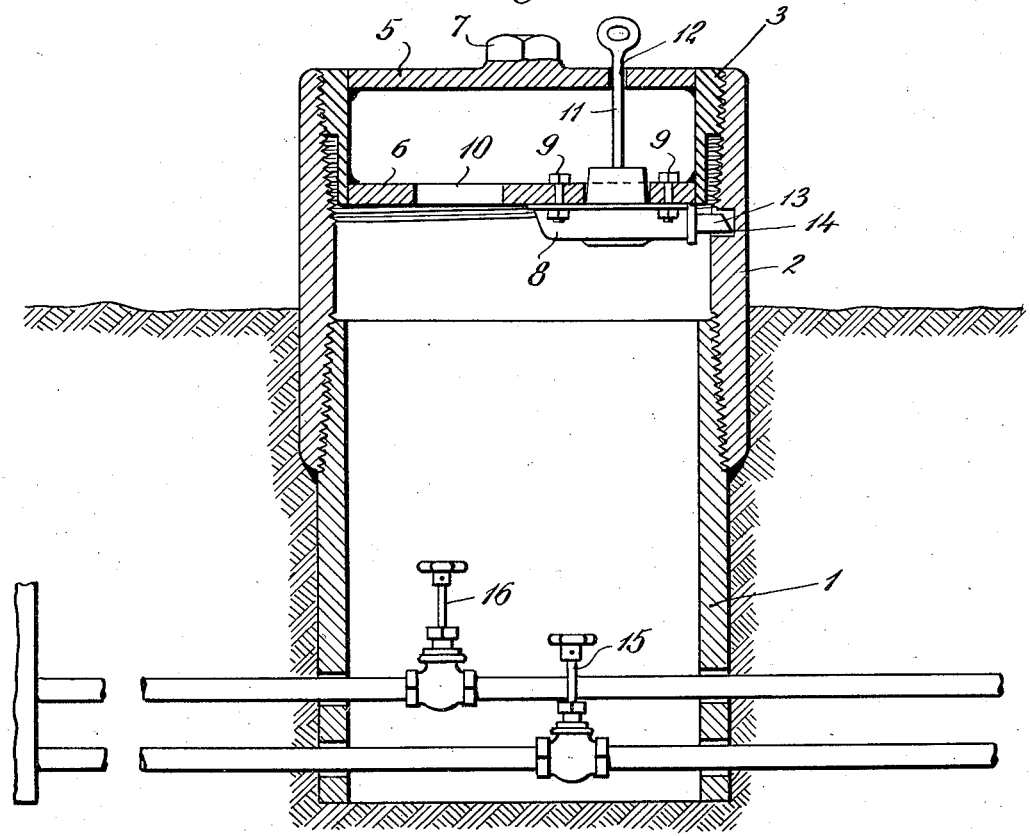

Nov. 26, 1935.  O. B. ZEEK  2,022,267

PROTECTIVE DEVICE FOR CASING HEAD DRIPS

Filed Aug. 31, 1933

INVENTOR
Orf B. Zeek
BY
Dallas R. Lamont
ATTORNEY

Patented Nov. 26, 1935

2,022,267

UNITED STATES PATENT OFFICE 2,022,267

PROTECTIVE DEVICE FOR CASINGHEAD DRIPS

Orf B. Zeek, Shamrock, Okla., assignor to Magnolia Petroleum Company, Dallas, Tex., a corporation of Texas Application August 31, 1933, Serial No. 687,563

1 Claim. (Cl. 137—13)

This invention relates to locking protective devices and specifically to devices designed to protect casinghead drip collection tanks from theft.

In the transportation of natural or casinghead gas by pipe line, it is usual for low places in the line to be points of accumulation for condensed liquids of the nature of gasoline. When the gas comes from the well head, this gasoline is likewise in a vaporous or gaseous state, but due to cooling caused by the expansion of the gas in its travel through the pipe, to atmospheric cooling, and to other causes, it condenses out. The collection of this liquid at low places causes serious difficulties with the operation of the pipe as a gas line, and it is customary to separate it from the gas by means of traps and similar devices and to remove it to small storage tanks placed nearby, usually underground. From these tanks it is collected at intervals by a tank wagon and carried to a central point for incorporation with other oil products. The means of transfer from the storage tank to the tank wagon is usually by means of pressure from a high pressure gas pipeline. A small pipe extends from the bottom of the tank to a point above ground whence a connection may be made to the tank wagon. A second small pipe extends from a high pressure pipe line to the space in the tank above the liquid. When connection is made to the tank wagon and the valves in both lines opened, the liquid is transferred. The line from which the liquid originates is usually under low pressure or even a slight vacuum, and the application of pressure in most cases is necessary to effect the transfer.

This liquid material so collected is of the general nature of gasoline, though quite a bit more volatile. Its exact characteristics vary widely, dependent upon the conditions surrounding its production. In all cases, however, it is either capable of being used as a motor fuel alone or of blending with low grade oil fractions such as kerosene and naphthas for use as a usable though poor motor fuel. As such, it is subject to a great deal of thievery. The isolation of the location of collection devices promotes this. However, the lines are regularly patrolled for other reasons and the installation of a protective device which the line-walker can observe in his rounds to detect tampering serves to greatly reduce such theft, and in such a device the presence of difficultly broken locking means will generally entirely prevent theft.

It has therefore been an object of this invention to provide a device which will protect casinghead drip storage from thievery by protecting normal operating devices under convenient lock and requiring somewhat extensive alteration of lines to render inoperative. It has been a further object to provide a device which may conveniently be manufactured from the material and by the means commonly available in the locality of use.

Figure 2:
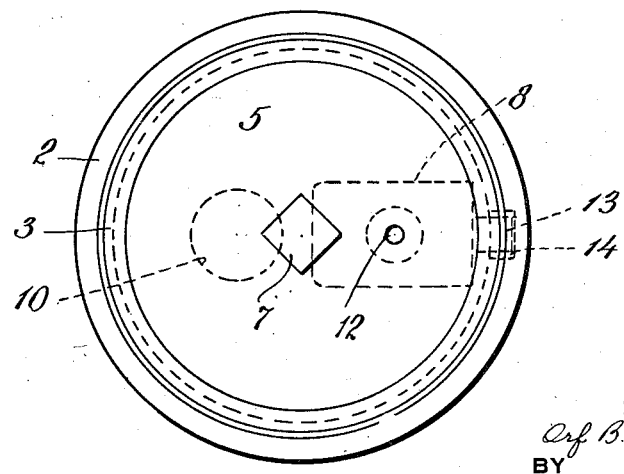

The device consists of a lockable valve housing which allows access to valves in both loading and pressure lines. In order that it may be fully understood, reference is made to the drawing attached to and made a part of this specification. In this drawing, Fig. 1 is a sectional view of the device and Fig. 2 is a view of the top. 1 is a short section of large diameter pipe, say of 8''. or 10'' pipe, and 2 is an ordinary standard coupling for such pipe, the two being screwed together tightly and they may be further secured by welding. 3 is a short nipple of similar pipe, from which all but a few threads have been removed, as shown. 5 and 6 are steel plates welded respectively into the top and bottom of the nipple 3. 7 is a square boss added to plate 5 by welding, which may be engaged with a wrench. 8 is a lock of any suitable type, fastened to plate 6 by bolts 9, access to the space between plates 5 and 6 being had by hole 10 in plate 6. A key 11, with extended handle, may be inserted through keyhole 12 in plate 5. The bolt 13 enters a recess 14 provided in part 2, and when extended prevents rotation and removal of the cover assembly. Protected by this device are the buried pressure line valve 15 and the transfer line valve 16.

Due to the location of the lock at a distance from the surface, it is comparatively free from picking, and the device being of steel, it cannot be broken by ordinary tools. It is true that the pipe lines might be dug up outside of the box and bypassed, but both lines must be bypassed to ensure delivery of product, and the amount of work involved is sufficient to discourage pilferage. Likewise the bypassing of both lines would leave traces which would be detected by the line walker in his regular rounds and organized systematic thievery would be detected. Further security may be had, if desired, by surrounding the entire installation with a block of concrete.

It is also possible, and fully within the contemplation of this invention that the device might be made of cast iron, or of cast semisteel, but the use of these materials would sacrifice advantages present in the preferred form of construction. For example, either of these materials would render the box capable of being broken by a few welldirected blows from a heavy sledge. Construction in these materials would require a shop having foundry facilities. Construction of the preferred form may not only be carried out in the ordinary oil field shop, with facilities and methods already at hand, but most of the material may be obtained from salvage no longer fit for the rigorous duties for which it was originally designed but admirably suited for the construction of this device.

I claim:

A locking valve box comprising a housing adapted to surround the valve and pipe to be protected, an upward extension of said housing terminating in a cylindrical collar, internally threaded, a recess in the inner wall of the housing, and a closure member for said collar, consisting of an externally threaded sleeve, an upper cover plate therefor, a lower cover plate attached to said sleeve and held thereby in spaced relation to said upper cover plate, key controlled bolt locking means attached to the lower side of said lower cover plate, adapted to extend its bolt into said recess, and registering openings in both plates through which a key may be inserted into said lock.

ORF B. ZEEK.